Patented Feb. 5, 1929.

1,700,810

UNITED STATES PATENT OFFICE.

LEO CHARLES RYAN, OF CHICAGO, ILLINOIS, ASSIGNOR TO OXWELD RAILROAD SERVICE COMPANY.

COMPOSITE RAILWAY-TRACK MEMBER.

No Drawing.   Application filed April 11, 1928.   Serial No. 269,302.

My invention relates to composite track members having a body portion of structurally strong material and a wearing surface of another material that is of comparatively greater hardness and has greater resistance to wear.

Railway rails, frogs, switches, crossings and the like should have adequate strength and toughness as structural members and a surface strength and hardness of the kind that will withstand severe shocks and wear. Track members have been made of steel of fairly high carbon content and of heat treated 14% manganese steel. The carbon steel in which the carbon content must be confined within certain definite limits in order to avoid brittleness possesses the requisite strength as a structural member but it is deficient with respect to its wearing qualities. The manganese steel when properly treated to develop an austenitic structure has sufficient strength as a structural member and it is somewhat harder on the surface than the carbon steel, but when the material is worked mechanically or with heat, a hard brittle material is developed and alterations and repairs cannot be made without removing the member and again heat treating it. The proper development of a uniform strength and austenitic structure is difficult to obtain in these railway track members. Consequently the quality of the track members made of the latter material is not uniform and dependable. They are costly and their use is limited.

Attempts to make composite track members by welding together low and high carbon steels or low carbon steel and manganese steel have been made but such composite materials failed to provide the desired properties either because of defects in the welding properties of the materials or because the welding developed undesirable properties in one or both of the materials.

I have discovered that a steel having the desired structural strength can be coated or sheathed where it is subjected to wear with a wear-resistant alloy which by itself is comparatively brittle. When the wearing portion of a track member, such as a carbon steel or a manganese steel rail of the desired structural strength, is built-up with certain alloys hereinafter described, the member is wear resistant and the shield is adequate to withstand the pounding to which it is subjected in service. The structural strength of the coated member is not detrimentally affected and it is resistant to pounding to a surprising degree. The sheathed members do not chip, spall or crack when the alloy is superimposed on a steel of the proper structural strength.

I prefer to apply a coating of one of the alloys contemplated by the invention by fusing the alloy on the rail by means of a gas welding device, although other welding means may be used. I coat a track member of a carbon steel or manganese steel with an alloy containing a substantial amount of chromium, tungsten, cobalt and carbon. The preferred coating has a Brinell hardness without heat treatment of about 350 to 400 but the coatings may be made with alloys that have a hardness of 300 to 500. The surface of the article is homogeneous and uniformly hard when the coating is applied by funsion and although the shielding metal itself is more brittle than the steel of a steel rail, the composite member shielded in accordance with my invention has a structural strength not materially different from the steel base metal and in service, it resists pounding and wear better than either of the materials alone.

The various constituents in the coating or added metal may be varied within quite broad limits without adversely effecting the desired quality of the composite member. Cobalt may vary from 20% to 65%, chromium 15% to 35%, tungsten 2% to 15%, and carbon 0 to 2.5%. Either iron or nickel or both of them may be present from 0 to 40%. Manganese may be present up to 1.5% and silicon may be present up to 1.25%. The manganese, silicon and carbon are not considered essential elements in the shielding alloy. They may be included to provide special properties although the manganese and silicon are desirable in all of them as they cause the metal to flow more readily when it is welded. Carbon is usually present as an impurity in most commercial alloys but it may be present in larger amount. Carbon hardens the alloy to some extent.

A composition that operates successfully, is particularly resistant to wear, is readily fusible and will not detrimentally affect the structure of a base metal either of manganese steel or of carbon steel by the heat of the welding operation contains:

| | Per cent. |
|---|---|
| Chromium | 32.83 |
| Tungsten | 3.80 |
| Cobalt | 55.99 |
| Carbon | 1.78 |
| Silicon | .50 |
| Manganese | .64 |
| Iron | 2.96 |
| Nickel | 1.50 |

Another successful composition having a greater percentage of nickel and being somewhat softer, tougher and more resistant to shock contains:

| | Per cent. |
|---|---|
| Chromium | 30 |
| Tungsten | 11 |
| Cobalt | 27 |
| Carbon | 1 |
| Silicon | 0.5 |
| Manganese | 0.5 |
| Nickel | 30 |

Although the entire wearing surface of the track member may be shielded and an addition of any desired form or thickness may be built on the entire track member in accordance with my invention, I do not intend to limit myself thereto. I have obtained good results by confining the coating to those parts of track members that are subjected to the greatest pounding and wear, such as the crotch of railway crossings and "frogs". My invention is particularly useful in connection with the repair of track members. A track member in which the worn off portions are built up in accordance with my invention will withstand the severe shocks and provide the wearing qualities and structural strength necessary for the most severe service.

I claim:

1. A composite track member consisting of a structurally strong ferrous material having a shield of added material autogeneously joined thereto, said added material being more resistant to wear than said ferrous material and containing chromium, tungsten and cobalt as the main essential constituents thereof.

2. A composite track member consisting of a structurally strong ferrous material having a shield of added material autogeneously joined thereto, said added material being more resistant to wear than said ferrous material and containing chromium, tungsten and cobalt as the main essential constituents thereof, said alloy including nickel and carbon.

3. A composite track member consisting of a structurally strong ferrous material having a shield of added material autogeneously joined thereto, said added material being more resistant to wear than said ferrous material and consisting of chromium, tungsten, cobalt, nickel, manganese and silicon.

4. A composite track member consisting of structurally strong ferrous material having a shield of added material autogeneously joined thereto, said added material being more resistant to wear than said ferrous material and containing chromium 15% to 35%, tungsten 2% to 15% and cobalt 20% to 65% as the main essential constituents thereof and carbon 0 to 2.5%.

5. A composite track member consisting of a structurally strong ferrous material having a shield of added material autogeneously joined thereto, said added material being more resistant to wear than said ferrous material and containing chromium 15% to 35%, tungsten 2% to 15%, cobalt 20% to 65% as the main essential constituents thereof, said alloy including carbon 0 to 2.5% and nickel 0 to 40%.

6. A composite track member consisting of structurally strong ferrous material having a shield of added material autogeneously joined thereto, said added material being more resistant to wear than said ferrous material and containing chromium 15% to 35%, tungsten 2% to 15%, cobalt 20% to 65% as the main essential constituents thereof, said alloy including iron and nickel 0 to 40%, manganese 0 to 1.5% and silicon 0 to 1.25% and carbon 0 to 2.5%.

7. A composite track member consisting of a structurally strong ferrous material having a shield of added material autogeneously joined thereto, said added material being more resistant to wear than said ferrous material and containing chromium 30% to 33%, tungsten 3% to 15%, carbon 1% to 2%, cobalt 25% to 60%, manganese and silicon in about equal proportions aggregating .5% to 1.5% and nickel 1% to 30%.

8. A composite track member consisting of a structurally strong ferrous material having a shield of added material autogeneously joined thereto, said added material being more resistant to wear than said ferrous material and being substantially of the following composition,

| | Per cent. |
|---|---|
| Chromium | 30 |
| Tungsten | 11 |
| Carbon | 1 |
| Cobalt | 27 |
| Silicon | 0.5 |
| Manganese | 0.5 |
| Nickel | 30 |

In testimony whereof, I affix my signature.

LEO CHARLES RYAN.